United States Patent [19]

Duin

[11] Patent Number: 5,520,143

[45] Date of Patent: May 28, 1996

[54] CELLULAR LIVESTOCK HAY FEEDER

[76] Inventor: Robert R. Duin, 30136 Rolling Hills Dr., Valley Center, Calif. 92082

[21] Appl. No.: 276,029

[22] Filed: Jul. 15, 1994

[51] Int. Cl.$^6$ .................................................. A01K 5/02
[52] U.S. Cl. ................... 119/51.13; 119/56.1; 119/57.92; 222/650
[58] Field of Search .......................... 119/51.11, 51.04, 119/51.13, 51.14, 57.92, 56.1; 222/650; 221/90, 126, 12, 112, 103

[56] References Cited

U.S. PATENT DOCUMENTS

| | | | |
|---|---|---|---|
| 1,274,845 | 8/1918 | Bird | 119/56.1 |
| 3,658,036 | 4/1972 | Caracappa. | |
| 3,683,859 | 8/1972 | Kirk | 119/51.13 |
| 3,884,189 | 5/1975 | Ruth | 119/51.13 |
| 4,279,221 | 7/1981 | Arvizu. | |
| 4,491,240 | 1/1985 | Ruskin et al. | 221/90 |
| 4,665,863 | 5/1987 | Toledo | 119/51.13 |
| 4,981,106 | 1/1991 | Nagatomo. | |
| 5,109,799 | 5/1992 | Lader | 119/51.13 |
| 5,345,893 | 9/1994 | Morris | 119/51.11 |

FOREIGN PATENT DOCUMENTS

| | | | |
|---|---|---|---|
| 2483742 | 12/1981 | France | 119/51.13 |
| 171470 | 11/1904 | Germany | 119/56.1 |
| 444932 | 5/1927 | Germany | 119/56.1 |
| 19460 | 11/1909 | Norway | 119/51.13 |

*Primary Examiner*—Todd E. Manahan
*Attorney, Agent, or Firm*—Gene Scott Patent Law & Venture Group

[57] ABSTRACT

An apparatus for automatically dispensing measured amounts of hay to livestock on a selected schedule consists of a rectangular enclosure with a loading door on one side and dispensing doors on the opposite side. The enclosure is divided into adjacent cells by a series of parallel, off-angle partitioning walls, each cell being sized to accept a flake of hay or other appropriate single-feeding feed portion. The invention can be oriented horizontally in a top-loading, or rear-loading configuration, or vertically on its end, to accommodate different situations. In the top-loading configuration a hinged door that opens downward is attached to the bottom of each cell. A sequencing bar extends the length of the enclosure to hold the doors closed initially and to allow the doors to open and the flakes to be dropped on schedule when the bar is moved linearly. A rack and pinion, a drive motor, a timer controlled circuit, position tabs on the bar, and an electric sensing switch provide accurate means for this movement. The enclosure has an inclined chute positioned to catch the falling flakes and guide them to an appropriate place for feeding the animals.

12 Claims, 5 Drawing Sheets

CELLULAR LIVESTOCK HAY FEEDER

FIELD OF THE INVENTION

This invention relates generally to the field of animal feeding devices and more particularly to an automatic stock feeder for dispensing hay to large farm animals, but it can also be applied to domesticated animals.

BACKGROUND OF THE INVENTION

Devices for automatically dispensing a measured mount of feed on a timed schedule are needed to feed farm or ranch animals in many situations, such as when those normally involved in feeding activities are not available for extended periods of time or when it is desired to tend to animals in remote locations automatically. In the case of farm animals it is desirable to dispense feed at regular intervals, and, in between these intervals, to hold or store the feed in such a manner as to prevent the feed from being eaten by wild creatures. In particular and specifically in relation to the present invention, it should be noted that a feeder for hay flakes is desirable. Hay flakes are small bales of hay formed into a rectangular shape. These flakes provide an amount of feed necessary for sustaining cattle and horses during one feeding period. The need for timed or regulated feed devices is repeatedly demonstrated by the many devices that have appeared on the market or are described in the literature and other publications.

Several prior art devices that are most pertinent to the present invention have been built to provide pre-measured amounts of food to animals automatically on a timed schedule. One such device, disclosed in U.S. Pat. No. 3,658,036 to Caracappa, has multiple compartments arranged radially about a vertical axis, each compartment having its own trap door on hinges. This device also has a holding finger for each compartment to hold the trap door closed until a rotating disc is aligned so as to release the finger and permit the door to drop and release the food from that compartment. This device has obviously been designed to feed a household pet or other small animal. It is not large enough nor rugged enough for use in the feeding of large ranch or farm animals. Its design does not scale up efficiently to a size necessary for adequately feeding such animals because the circular cannister for storing and dispensing the feed and the circular feeding dish beneath it would have to be built too large, and the disc that keeps the trap doors closed would have to be built too sturdy, to be economical. In addition, the hinged trap doors and holding fingers for all of the compartments comprise many moving parts, thus making the device overly complicated, expensive to manufacture, and subject to mechanical failure and excessive need of maintenance.

Another device which is disclosed in U.S. Pat. No. 4,279,221 to Arvizu shows a hopper where granulated food is stored in bulk form and from which it is gravity fed through a rotating food dispenser which is sized to measure the desired amount of food. While this invention has fewer moving pans than the preceding one, it would not be suitable for dispensing hay flakes because the hay flakes are too large to be properly measured and fed through the rotating food dispenser.

A third device for automatically feeding animals is disclosed in U.S. Pat. No. 4,981,106 to Nagatomo. This is a battery-powered device that can dispense measured quantities of grain or other finely divided dry feed material on a set schedule. However it is basically only useful for small domestic pets such as fish or birds. The design would not economically scale up to a size needed to feed adequate portions to hay eating farm animals because the carousel, which contains all the feed and must be rotatably moved by the motor, would necessarily become a large and heavy structure.

A fourth device, which is being marketed for horse feeding, is the automatic carousel feeder. While this device is fairly simple and efficient for its intended purpose, its use is restricted to the feeding of a single horse because the amount of feed is adequate for only a single animal, and the feed is made available in a small area so that multiple animals would compete for the food and scuffle to obtain it. Its design does not allow for efficient scaling up for use by more than a single animal. Thus for multiple animals there would be no economy of size, and multiple feeders would be necessary.

Various other devices also exist for satisfying the feeding of specific animals such as hogs or fish. However, none of these satisfies the need for a means to automatically feed adequate measured quantities of hay to farm animals on a timed schedule. The hog feeding device requires feed in a mushy, semi-liquid state, and the fish feeding device is too small and fragile, and is designed to be attached to an aquarium. Clearly there is a need for a device that is designed to automatically dispense a measured amount of feed for farm or ranch animals such as horses and cattle on a selected schedule, and to have a large enough capacity for several days' worth of food. Such a device would be of a simple enough design that it would be relatively easy and inexpensive to manufacture and it would not be subject to frequent breakdowns, jamming or excessive preventive maintenance. Such a device would be rugged enough to be used for the feeding of large, active animals that could damage a more fragile design. The device would be versatile enough to be capable of automatic feeding of from 1 to 4 days without the need to reload the apparatus. Such a device would also have the advantages of being easily loaded, easily set as to time schedule, not easily damaged or affected by rain or snow, i.e., just as applicable for outdoor as for indoor use, and would prevent wild animals from attacking the stored feed. The present invention fulfills these needs and provides related advantages. A previous patent application, Ser. No. 08/257,558 was filed by the present inventor on Jun. 9, 1994 showing and claiming a rotary design for a livestock hay feeder. However this apparatus is less space efficient then the present apparatus, especially when scaled upwards to larger sizes.

SUMMARY OF THE INVENTION

The present invention is an apparatus for automatically dispensing measured amounts of hay on a selected schedule over a period of days to horses, cattle, and other farm or ranch animals. The apparatus is simple and rugged, yet reliable and efficient. The device is designed to handle hay flakes primarily, but can also handle any kind of feed configured in coarse granules, cubes, or pellets. Additional advantages this invention has over other automatic feeding devices are its versatility and adaptability, its efficiency of design, and its scalability. For example, the same device can be oriented in several different ways to accommodate different situations. It can be oriented horizontally where floor, or ground, space is not limited. That configuration can be either top-loading for loading from a truck or by simply rotating the unit about its own horizontal axis, it can become a rear-loading unit. If surface area is at a premium the same device can be stood on end and operated just as efficiently.

The design is extremely efficient in that most of the device is used to hold the feed with virtually no wasted space, while only a small fraction of it is used for implementing the automatic dispensing feature. Finally, this invention is easily linearly scaled size for even greater economy and efficiency by simply building more in-line cells to store and dispense more feed. Even when doubling or tripling the size of the device, the means for automatically dispensing the feed remains basically unchanged.

In its horizontally oriented, top-loading configuration the invention consists of a horizontally oriented rectangular enclosure with an open top and an open bottom. The enclosure is divided into identical cells, preferably sized to accept one flake of hay each, the cells separated by a series of parallel partition walls that are oriented slightly off-vertical so that when the flakes fall they will tip over into a horizontal orientation for ease of feeding. Each cell has a hinged door at the bottom that, when in a closed, horizontally oriented position prevents a flake from leaving the cell, and when in an open, vertically oriented position, permits a hay flake or other material in the cell to fall from the cell. The horizontally oriented, rear-loading configuration and the vertically oriented configuration are basically identical except for their orientation. In all orientations a movable linear sequencing bar with linear series of slots is provided to support the doors in the closed position by simple supporting rods extending from the doors, and to release the doors in sequence in accordance with a predetermined schedule. The bar is moved by a drive motor which is coupled to a pinion that engages a rack on the bar. The motor is controlled by a simple and rugged electrical circuit which is provided for setting a desired schedule for movement of the bar for dropping the hay flakes through the doors, whereupon the flakes slide down on a chute for access by the farm animals. The circuit is adaptable to any selected feed schedule. A sensing position switch provides positive feedback of the alignment of the slots and the rods by the use of position tabs on the bar so that positional error due to misalignment may be avoided.

BRIEF DESCRIPTION OF THE DRAWINGS

The accompanying drawings illustrate the invention. In such drawings:

FIG. 1A is a detail drawing of one section of the linear sequencing bar closest to the motor showing the rack, the position tabs, and the position switch;

FIG. 2A is a left side elevation view of the invention as shown in FIG. 2, but showing the top cover in an open position and a hay flake being loaded;

DETAILED DESCRIPTION OF THE INVENTION

Figure 1:
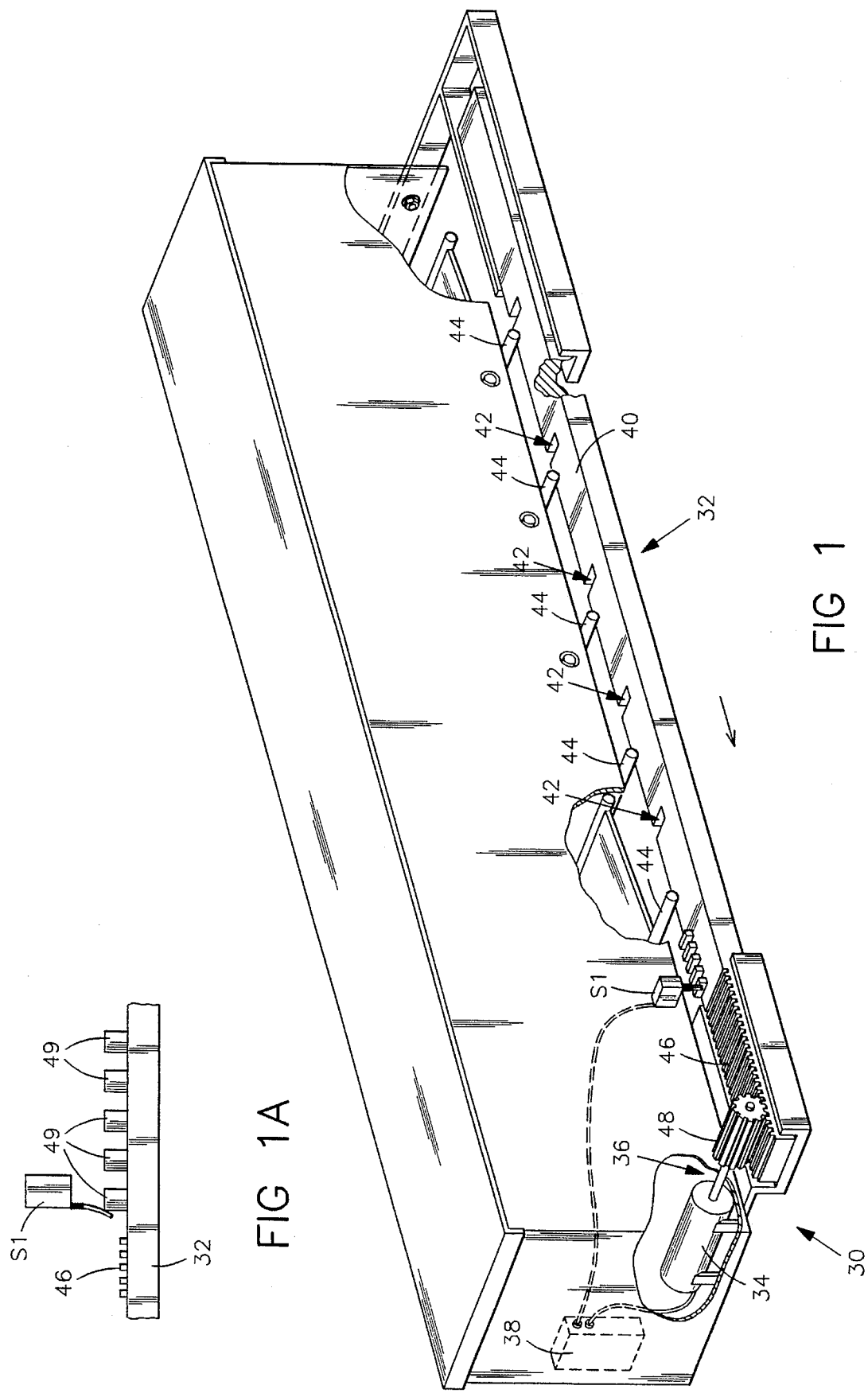
FIG. 1 is a perspective illustration of the invention illustrating the enclosure, and particularly showing a linear sequencing bar with an arrangement of slots and position tabs, a position switch, the doors, their hinges, an arrangement of rods extending out from the doors, a rack and pinion, a coupling means, the drive motor, and the control means.
Figure 2:
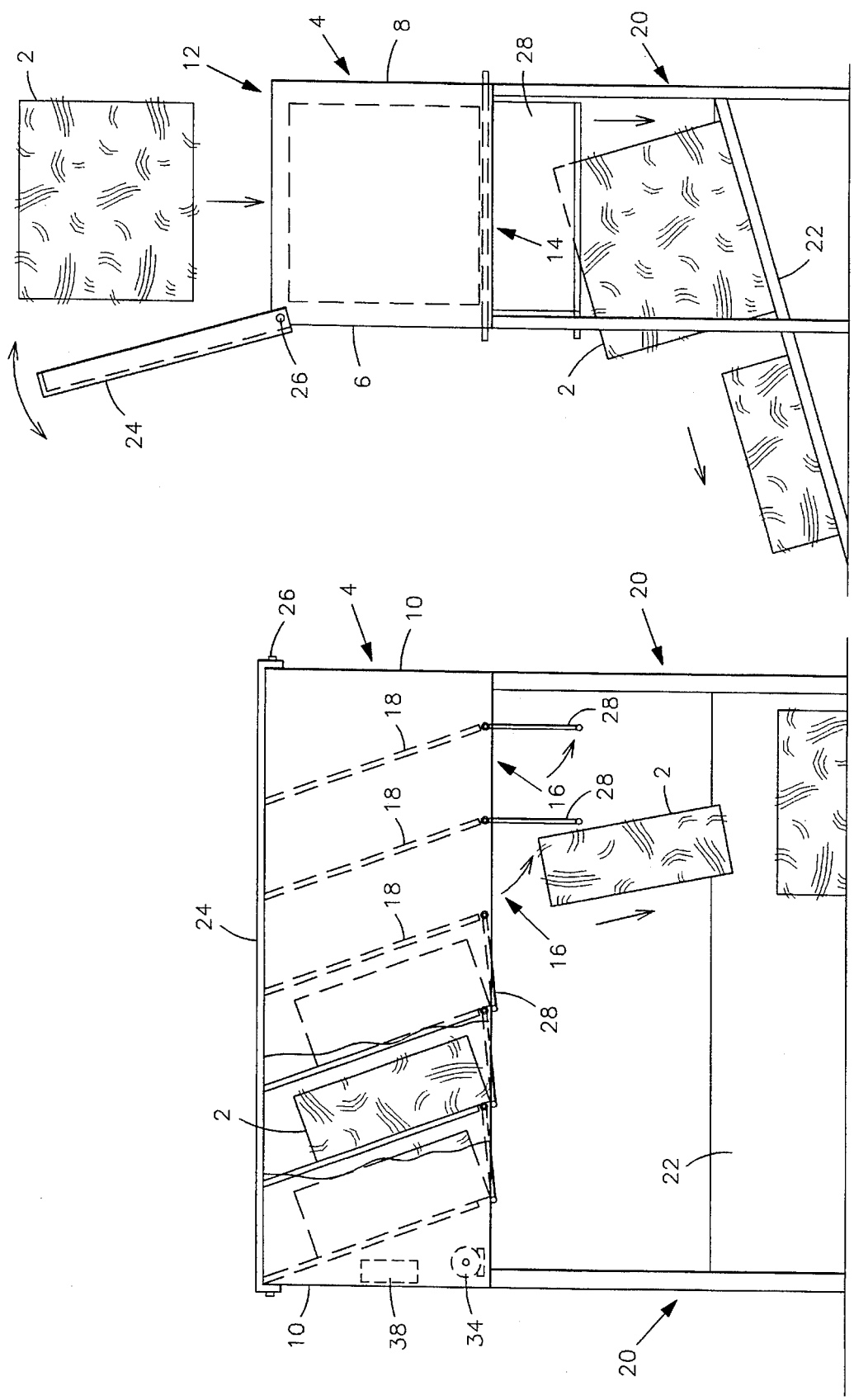
FIG. 2 is a front elevation view of the invention of FIG. 1 illustrating the enclosure with five cells formed by off-vertical partitioning walls, doors of the cells, two of which are open, flakes of hay in the closed cells, two flakes of hay that have been released, a top cover, a support means, an inclined chute, a drive motor, and a control means.

FIGS. 1 and 2 show an apparatus for automatically dispensing a plurality of hay flakes 2, or other feed in such form as, for example, grain, coarse granules, cubes, or pellets, on a predetermined schedule. A vertical rectangular enclosure 4 has a front wall 6, a rear wall 8, two side walls 10, an open top 12, and an open bottom 14. A series of flake storage cells 16 are established within the enclosure 4 by a plurality of partition walls 18 arranged in parallel positions between the front wall 6 and the rear wall 8, and supported by said walls 6 and 8 at an off-vertical angle. Each cell 16 accommodates one flake 2 in an off-vertical position so that upon release from the cell 16 the flake 2 will slide out of the enclosure 4 and tip over, rather than remain upright. A support means 20 is provided for supporting the enclosure 4 above the ground, and an inclined chute 22 is positioned below the enclosure 4 so that the flakes 2 that are released from the cells 16 land upon the chute 22 and slide to a position advantageous for feeding. The support means 20 may be a set of fixed legs of adequate structural integrity, or for example, telescoping or adjustable locking legs that can accommodate uneven ground surface. A top cover 24 extends over the enclosure 4 and includes a hinge means 26 by which the cover 24 is attached to the enclosure 4. The hinge means 26 operates to allow the cover 24 to move into a closed position protecting the cells 16 from weather elements, and into an open position for loading flakes 2 into the cells 16.

A plurality of doors 28 are provided, one for each cell 16, horizontally oriented and arranged in a linear horizontal sequence at the open bottom 14 of the enclosure 4. Each door 28 is rotatably hinged at the open bottom 14 of the enclosure 4 between the front wall 6 and the rear wall 8 so as to move between a horizontally oriented position for enclosing one of the cells 16, and a vertically oriented open position extending downwardly from the enclosure 4 for allowing a hay flake 2 to fall from the cell 16 to the ground.

Figure 3:
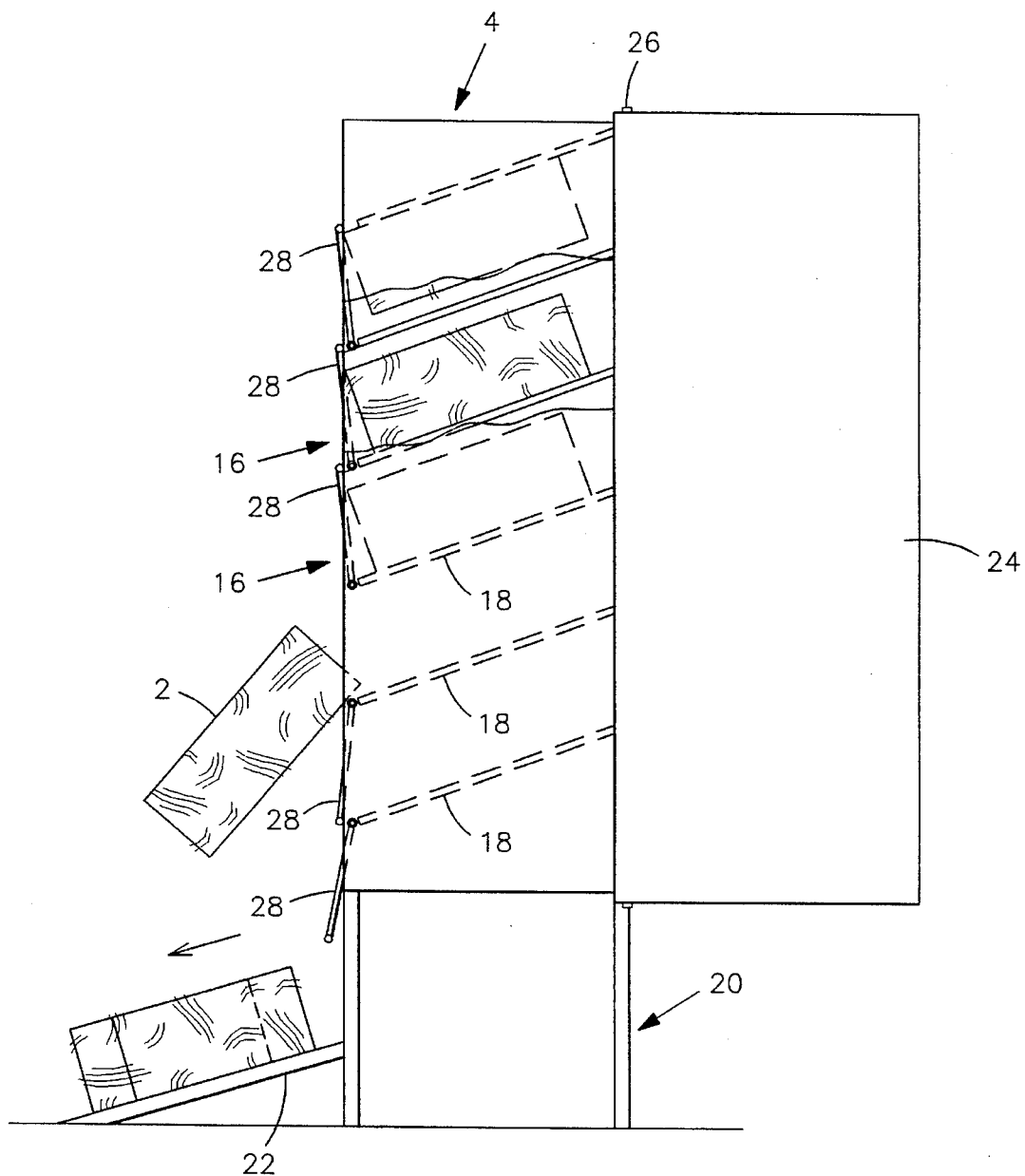
FIG. 3 is a left side elevation view of the invention as shown in FIG. 1, but with the enclosure rotated 90 degrees to stand vertically with the cells one above the next.
Figure 4:
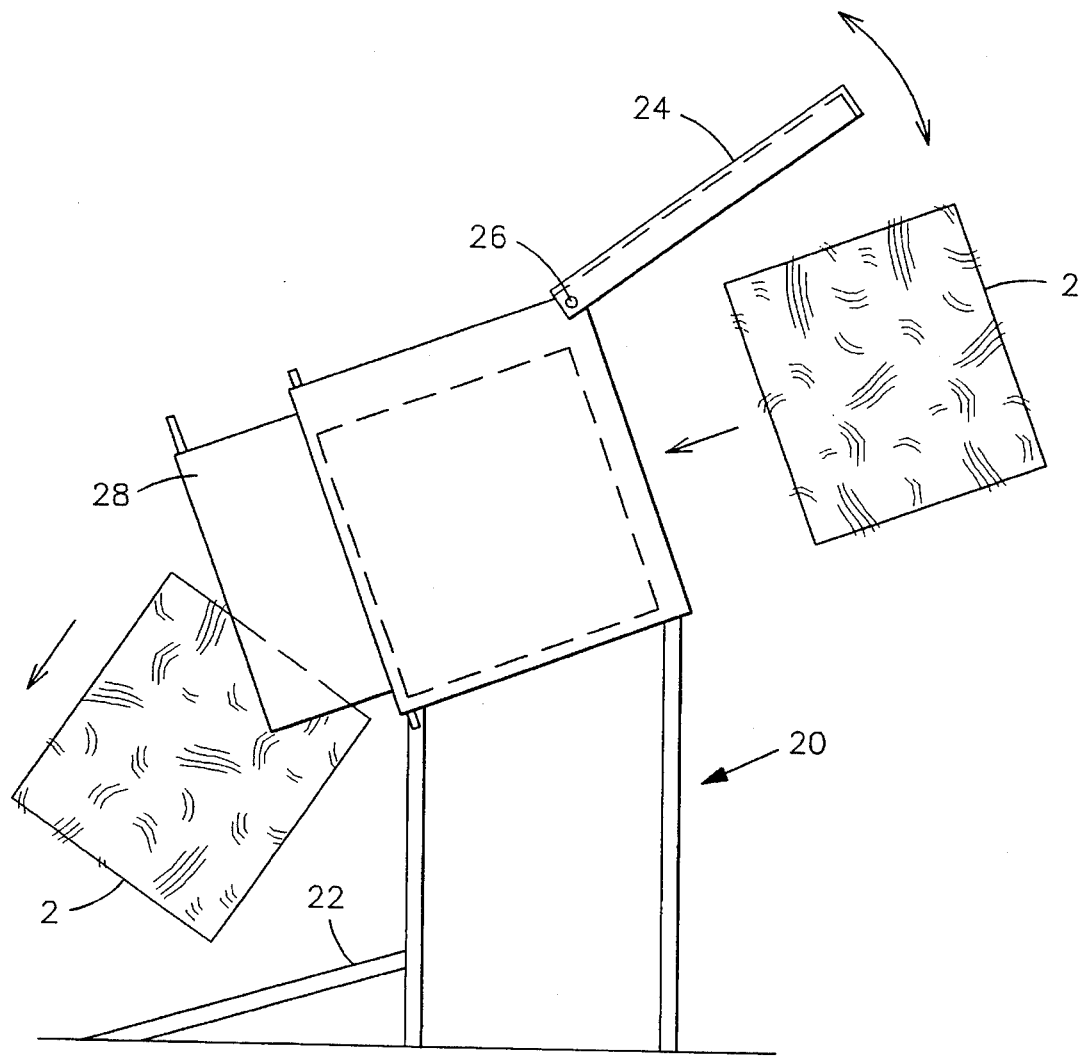
FIG. 4 is a left side elevation view of the invention as shown in FIG. 1, but with the enclosure rotated approximately 70 degrees so that flakes are loaded into the back of the enclosure at a slight downward angle and slide out from the front of the enclosure at a slight downward angle.

FIGS. 3 and 4 show other possible orientations of the invention in which the operation is essentially identical due to the unique structure. For clarity in visualizing the operation of the invention with respect to loading and unloading the feedstock, the closure means 30 is omitted in FIGS. 1 through 4.

Figure 5:
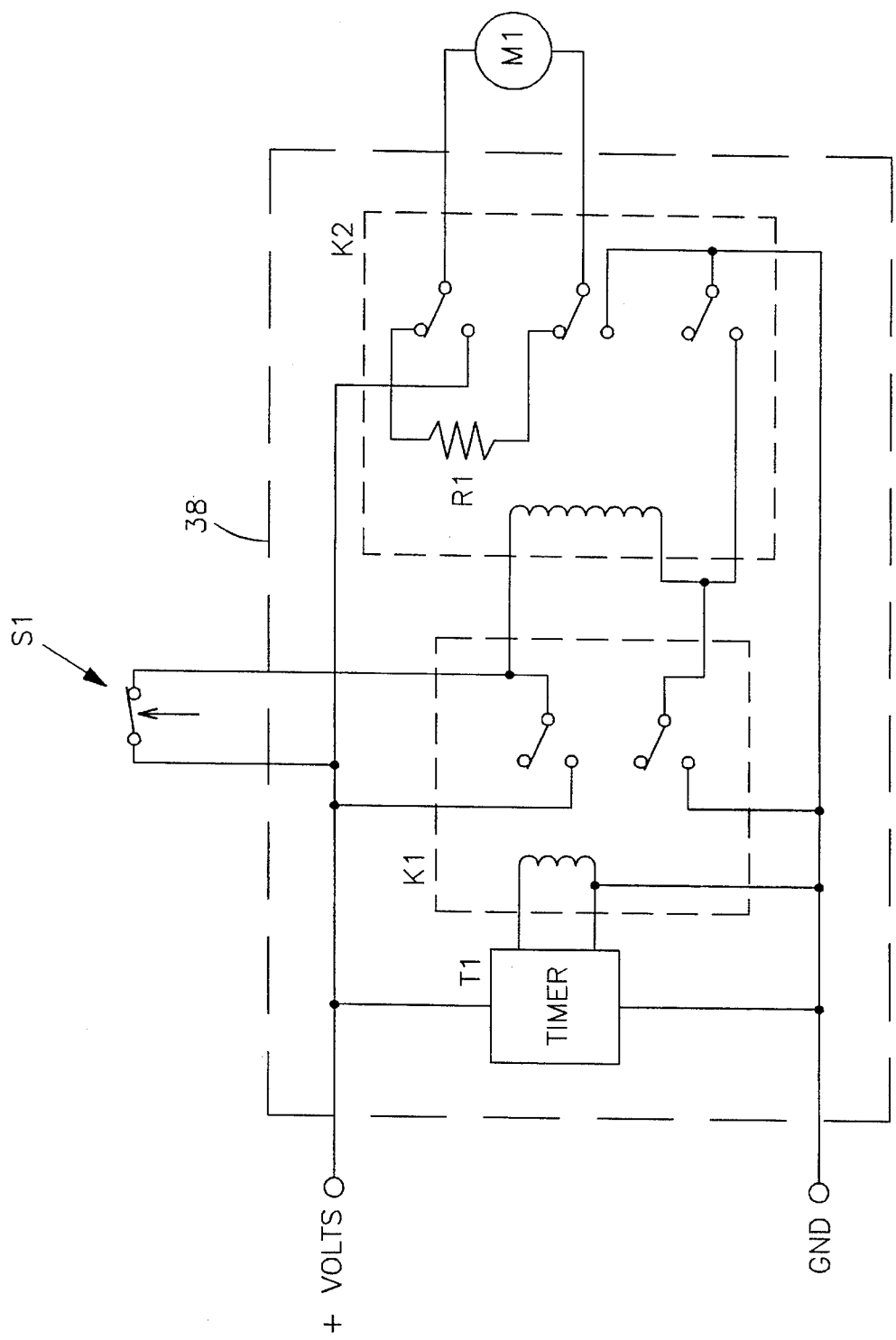
FIG. 5 is a schematic diagram of an electrical circuit of the invention.

FIG. 5 shows the preferred closure means 30 which is provided for supporting the doors 28 in the closed position wherein they enclose the cells 16, and for releasing the doors 28 in sequence so as to dispense the hay flakes 2 over a predetermined period of time in accordance with the selected schedule. In this example, the closure means 30 has a horizontally oriented linear sequencing bar 32, a drive motor M1, and coupling means 36 for moving the bar 32 horizontally, and a control means 38 for moving the bar 32 such that the doors 28 open in accordance with the selected schedule. Under the control of the control means 38, the motor M1 drives the coupling means 36 to move the bar 32 in a linear manner. The bar 32 has an upfacing top surface 40 in which is contained a series of evenly spaced slots 42. The doors 28 each have a door rest means which in this example is a rod 44 extending so as to lay in contact with the top surface 40 so that the bar 32 supports the doors 28 when the doors 28 are placed in the closed horizontally oriented position. In like manner, the doors are maintained in the closed orientation when the invention is otherwise oriented. The slots 42 are positioned and arranged along the bar 32 so that as the bar 32 is moved, each one of the series of slots 42 is positioned, in turn, at on of the rods 44. The slot-rod alignment then provides for releasing each of the doors 28 in turn for releasing a hay flake 2. The door rest means, which is in its simplest form is the rod 44 extending from each of the doors 28, may also be implemented by a springbolt, slidebolt, or may imploy any number of other common sliding mechanisms so that as the doors are closed, the door rest means may be either manually or automatically withdrawn when brought into contact with the bar to allow the door to pass the bar when closing it.

FIG. 5 also shows an example of a coupling means 36 that includes a rack 46 at the end of the bar 32 closest to the motor M1, and a pinion 48 that engages the rack 46 and is directly driven by the motor M1.

FIG. 5A shows the detail of the end of the linear sequencing bar 32 closest to the motor M1, and in particular the rack 46, the position tabs 49, and the position switch S1.

FIG. 6 shows an example of a control means 38. Here a timer controlled circuit 38 is provided for activating the motor M1 for driving the coupling means 36 so as to position the bar 32 appropriately so that the rods 44 become aligned with their respective slots 42 in the bar 32. This allows the releasing of the doors 28 and the dropping of the flakes 2 onto the chute 22 in accordance with the selected schedule. The apparatus as described may be filled with flakes 2 for time scheduled feeding of animals by dropping flakes 2 over a selected period of time, into the chute 22, such flakes 2 then being positioned for feeding by the animals. This is accomplished by positioning an electrical switch S1, electrically interconnected to the control means 38, as shown in FIGS. 5, 5A, and 6, so as to sense when a position tab 49 is positioned at the switch S1, and thus when the corresponding slot 42 is aligned with its respective rod 44 allowing that rod 44 to drop through the slot 42 thereby releasing the door 28. Drive power and switching power for the operation of the apparatus may be supplied by standard AC power circuits when the apparatus is used indoors or where it may be provided with such power supply wiring. In remote applications, the apparatus is powered by low voltage DC power supplied by a 12 volt dry cell battery with solar backup. Such batteries may be replenished on a continuing basis by common solar energy collection panels such as photovoltaic cells, converting sunlight energy directly into electrical current for storage in, for example, a special automotive 12 VDC storage battery. Whatever source and type of power is used, it is intended herein that the apparatus for providing such power is to be considered as a part of the control means 38 of the invention. FIG. 6 is an electrical schematic diagram showing one possibility for a simple means for moving the linear sequencing bar 32 between positions for releasing the flakes 2. In this circuit, timer T1, which could be a micro-processor based timer, an R-C electrical circuit timer, a mechanical device or any other timing means, closes relay K1 momentarily at a time for feeding. Relay K1 closes relay K2 placing motor M1 into the circuit and locking relay K2 in the actuated state. The linear sequencing bar moves until the first of the position tabs 49 makes contact with the position switch S1, which occurs when the rod 44 of the first door 28 is aligned with the first slot 42; door 28 being thereby released, at which time relay K2 is deenergized. At this time motor M1 is reestablished across braking resistor R1 so that linear overshoot is minimized. The process is repeated sequentially at appropriate times, for the second and subsequent position tabs.

While the invention has been described with reference to a particular embodiment, it is to be clearly understood by those skilled in the art that the invention is not limited thereto. Rather, the scope of the invention is to be interpreted only in conjunction with the appended claims. Although the described invention is primarily designed as a livestock feeder, other embodiments could be used for feeding domestic or wild animals such as, for example, deer, moose, birds, and the like.

What is claimed is:

1. An apparatus for automatically dispensing a plurality of hay flakes onto a ground surface in accordance with a feeding schedule comprising:

a front wall, a rear wall, and a pair of side walls joined to form a vertical rectangular enclosure having an open top and an open bottom;

a plurality of partition walls arranged in parallel positions between the front and the rear walls of the apparatus and supported by said walls at an off-vertical angle, to establish a series of flake storage cells, each of the cells accommodating one of the hay flakes in an off-vertical position so, upon release from the cell, the hay flake tends to slide out of the enclosure and to tip over;

a support means for supporting the enclosure above the ground surface;

a plurality of horizontally oriented doors arranged in a linear horizontal sequence, each of the doors being rotatably hinged at the open bottom of the enclosure between the front and rear walls so as to move between a horizontal position for enclosing one of the cells, and a vertically oriented open position extending downwardly from the enclosure, for allowing a hay flake to fall from the cell to the ground surface;

a closure means for supporting the doors in the horizontal position and for releasing each of the doors in sequence, so as to dispense the hay flakes over a period of time in accordance with a selected schedule.

2. The apparatus of claim 1 further including an inclined chute positioned below the enclosure so that the flakes released from the cells land upon the chute and slide to a position advantageous for feeding.

3. The apparatus of claim 1 wherein the closure means includes a horizontally oriented linear sequencing bar having an upfacing top surface and a series of slots therein, the bar extending along the front side wall adjacent to the doors, a drive motor adapted for moving the bar horizontally, the doors each further including a door rest means extending from the door to lay in contact with the top surface of the bar so that the bar supports the doors when placed in the closed orientation, the slots positioned and arranged in the bar so that as the bar is moved each one of the series of slots is positioned, in turn, at the door rest means of one of the doors, the slot-door rest means alignment releasing each door in turn to enable each door to swing downwardly into the open orientation for releasing a hay flake, and a control means to cause the drive motor and coupling means to move the bar such that the doors open in accordance with the selected schedule.

4. The apparatus of claim 1 further including a top cover extending over, and hingably attached to, the enclosure, the cover providing hinge means operable to move the cover into a closed position protecting the cells from weather elements, and into an open position for loading hay flakes into the cells.

5. An apparatus for automatically dispensing a plurality of hay flakes onto a ground surface in accordance with a feeding schedule comprising:

a top wall, a bottom wall and a pair of side walls joined to form a horizontal rectangular enclosure having an open front and an open rear;

a plurality of partition walls arranged in parallel positions between the pair of side walls of the apparatus and supported by said side walls at an off-horizontal angle, to establish a series of flake storage cells, each of the cells accommodating one of the hay flakes in an off-horizontal position so, upon release from the cell, the hay flake tends to slide out of the open front of the enclosure;

a support means for supporting the enclosure above the ground surface;

a plurality of vertically oriented doors, each one of the doors positioned above the next one of the doors, each of the doors being rotatably hinged about a hinge at the open front of the enclosure between the side walls so as to move between a vertical closed orientation for enclosing one of the cells, and a vertical open orientation, the door extending downwardly from the hinge, for allowing a hay flake to fall from the cell to the ground surface;

a closure means for supporting the doors in the vertical position and for releasing each one of the doors in sequence, so as to dispense the hay flakes over a period of time in accordance with a selected schedule.

6. The apparatus of claim 5 further including an inclined chute positioned below the enclosure so that the flakes released from the cells land upon the chute and slide to a position advantageous for feeding.

7. The apparatus of claim 5 wherein the closure means includes a vertically oriented linear sequencing bar having a side-facing side surface and a series of slots therein and extending along the open front adjacent to the doors, a drive motor adapted for moving the bar vertically, the doors each further including a door rest means extending from the door to lay in contact with the side surface of the bar so that the bar supports the doors when placed in the closed orientation, the slots positioned and arranged in the bar so that as the bar is moved each one of the series of slots is positioned, in turn, at the door rest means of one of the doors, the slot-door rest means alignment releasing each door in turn to enable each door to swing downwardly into the open orientation for releasing a hay flake, and a control means to cause the drive motor and coupling means to move the bar such that the doors open in accordance with the selected schedule.

8. The apparatus of claim 5 further including a rear cover extending over, and hingably attached to, the enclosure, the cover providing hinge means operable to move the cover into a closed position protecting the cells from weather elements, and into an open position for loading hay flakes into the cells.

9. An apparatus for automatically dispensing a plurality of hay flakes onto a ground surface in accordance with a feeding schedule comprising:

a top wall, a bottom wall, and a pair of side walls joined to form a rectangular enclosure having an open from and an open rear;

a support means for supporting the enclosure above the ground surface in such an orientation that the top wall and the bottom wall are inclined at a downward angle from the open rear to the open front;

a plurality of partition walls arranged in parallel positions between the top and the bottom walls of the apparatus and supported by said walls in a vertical orientation, to establish a series of hay flake storage cells, each of the cells accommodating one of the hay flakes, so that, upon release from the cells, each of the hay flakes tend to slide out of the enclosure through the open front, the bottom wall and the open front being in such an orientation as to assure that the flakes are naturally projected forward of the enclosure;

a plurality of doors arranged in a linear sequence, each of the doors being rotatably hanged at the open front of the enclosure between the top and bottom walls so as to move between a closed position for enclosing one of the cells, and an open position extending forward of the enclosure, for allowing a hay flake within the cell to slide out of the cell;

a closure means for supporting the doors in the closed position and for releasing each of the doors in sequence, so as to dispense the hay flakes over a period of time in accordance with a selected schedule.

10. The apparatus of claim 9 further including an inclined chute positioned below the enclosure so that the flakes released from the cells land upon the chute and slide to a position advantageous for feeding.

11. The apparatus of claim 9 wherein the closure means includes a horizontally oriented linear sequencing bar having a sideways oriented surface and a series of slots therein and extending along the front of the enclosure adjacent to the doors, a drive motor adapted for moving the bar horizontally, the doors each further including a door rest means extending from the door to lay in contact with the sideways oriented surface of the bar so that the bar supports the doors when placed in the closed orientation, the slots positioned and arranged in the bar so that as the bar is moved each one of the series of slots is positioned, in turn, at the door rest means of one of the doors, the slot-door rest means alignment releasing each door in turn to enable each door to swing outwardly from the enclosure into the open orientation for releasing a hay flake, and a control means to cause the drive motor and coupling means to move the bar such that the doors open in accordance with the selected schedule.

12. The apparatus of claim 9 further including a rear cover extending over, and hingably attached to, the enclosure, the cover providing hinge means operable to move the cover into a closed position protecting the cells from weather elements, and into an open position for loading hay flakes into the cells.

* * * * *